United States Patent Office 2,711,197
Patented June 21, 1955

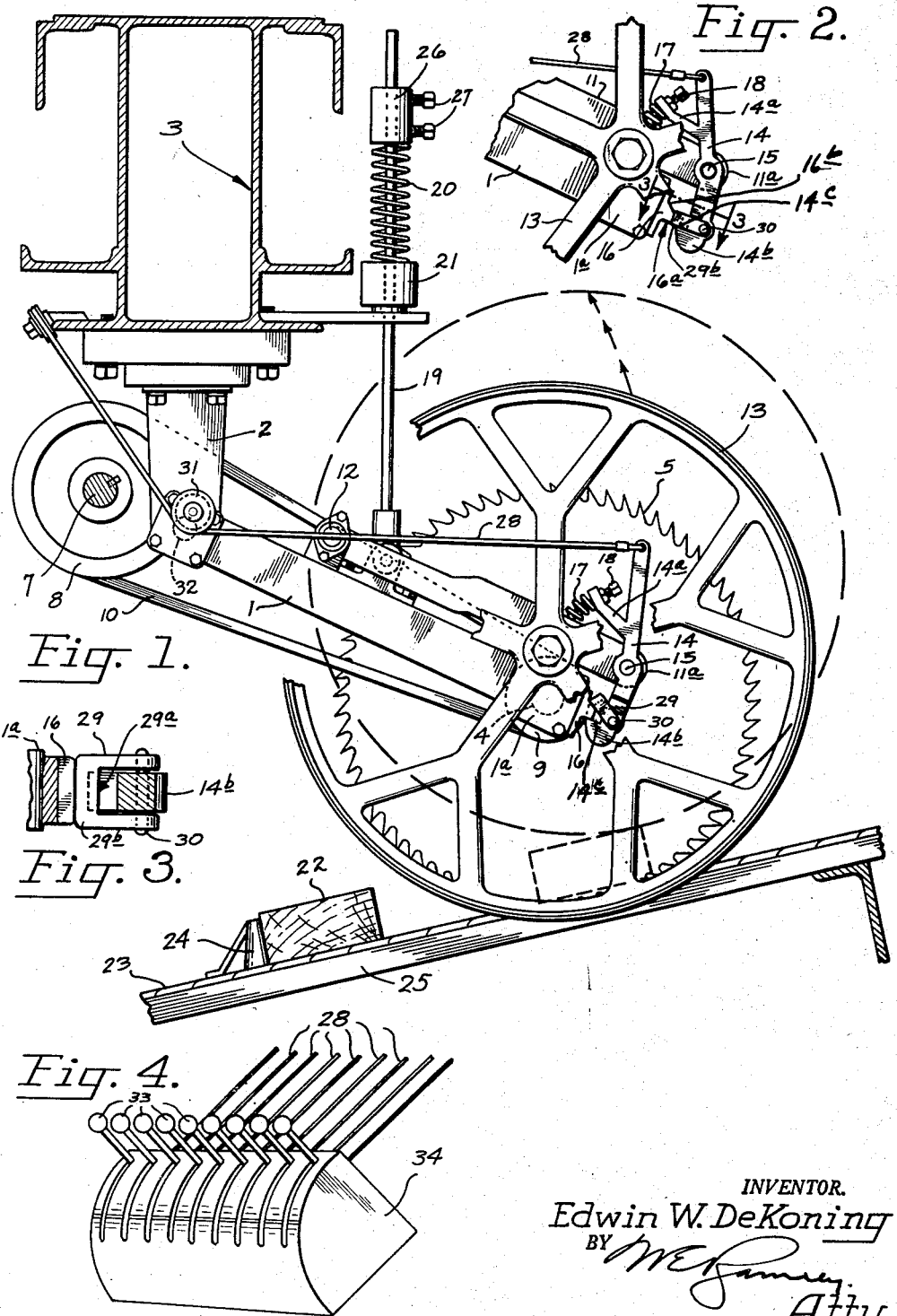

2,711,197
SELECTABLE LATCH FOR TRIMMER SAW

Edwin W. De Koning, Portland, Oreg.

Application March 15, 1952, Serial No. 276,742

10 Claims. (Cl. 143—41)

My invention relates to a so-called combined automatic and selective trimmer saw mechanism, which mechanism is used both to trim the ends of a length of lumber and also to trim out and remove imperfections from an intermediate portion thereof. Said trimmer saw mechanisms usually are arranged in gangs, each element of which is independently actuated or selectable. Each element of the gang comprises a driven saw and an associated rider wheel which is spaced laterally therefrom, but is axially alined therewith. Said rider wheels are of slightly larger diameter than the saws with which they are associated, and serve to ride over and lift the saw with which a given rider wheel is associated to prevent the latter from cutting a board. Detachable engaging means are provided between a saw and its rider wheel which may be disengaged by distant means and, when disengaged, permits the rider wheel to ride over the board without lifting the saw, and thus the saw remains in cutting position and severs the board passing beneath it.

It is old and common practice in the art to provide distant actuating means for said detachable connections between a saw and its rider wheel. A common means for effecting such distant disengagement is a flexible line or cord which leads to the operating station of a trimmer saw man, and which cord may be pulled to disengage a latch. In the past, however, said latch disengaging means must be held until a piece of lumber passes beneath a saw. This requires the operator to give his attention to the selection and the operation of said manipulation means to disengage a particular saw or saws immediately in advance of a piece of lumber moving under a gang of trimmer saws, and requires that he continue to fix his attention to the mechanism until a board has been trimmed. Thereafter, the rider wheel for a given trimmer saw moves down to its position of alinement with its saw and latching mechanism automatically is engaged.

A trimmer saw operator must not only view the piece of lumber being cut, but also must scan the following pieces of lumber which are moving into operating position to note what imperfections, if any, must be cut therefrom. It is thus difficult to operate the detaching means and to concentrate upon the next piece of lumber moving into position and to determine what cuts must be made therein.

I have discovered that said trimmer saw mechanism controls may be modified so that the latching means may be disengaged in advance of the operation, and said disengagement may be held by a mere selection and manipulation of a control, which when once it is set, causes the trimmer saw mechanism to move through one complete cycle of operation without further attention given to it by an operator. It will automatically be reset at the end of said cycle of operation. In the preferred embodiment of my invention, I preferably cause a shield or holder to be dropped between the latch engaging members which normally engage a saw to its guide wheel, and said shield will remain in disengaging position during one operating cycle and will automatically be lifted at the end of a cycle and reset to inoperative position, when the latch parts are engaged at the end of said cycle. By the use of such mechanism, an operator can select a saw or saws to be actuated in advance of the time a piece of lumber moves under the trimmer saws. Thereafter, he can have his mind and attention free to scan the succeeding piece of lumber moving into position. This increases the operating speed of a trimmer saw, and thus increases the production thereof and minimizes error.

The object of my invention is to provide means which are distantly actuatable by which the latching means may be detached in advance of operation, which will hold said devices detached during one cycle of operation and will cause them to be reset and attached at the end of said operating cycle.

A further and more specific object of my invention is to provide a mechanism which is gravity actuated, one that will swing freely into operating position, to hold the latching mechanism detached, and one that will be reset merely by alinement of the parts which are joined by said detachable latching mechanism.

A further object of my invention is to so arrange the distant control mechanisms that they will be unaffected by the movement of the trimmer saws, moving from inoperative to operating position and return to inoperative position during a normal operating cycle.

A further object of my invention is to provide such distant control mechanisms so that they may be grouped at the operator's station in closely related keys arranged within easy reach of one of the operator's hands, and individually selectable to cause one or more selected trimmer saws to be moved into operative or cutting position.

Other and further details of my invention are illustrated in connection with the accompanying drawings, in which:

Fig. 1 is an elevation of one unit of a gang of trimmer saws, portions of the frame being shown in section, portions of the rider wheel being shown broken away to disclose mechanisms which would otherwise be concealed, and the relative position of the rider wheel in automatic lifting position being indicated in dotted outline;

Fig. 2 is a fragmentary view of the latch control mechanism with which my invention is particularly concerned;

Fig. 3 is a still further enlarged detail view illustrating the latch, its keeper, and the bail for effecting disengagement thereof, said parts being shown as the bail shrouds the latch to prevent engagement between said latch and said keeper; and Fig. 4 is a perspective view of a bank of controls with multiple lines leading to the various units of a gang of trimmer saws, such for example as would be provided in a typical installation.

An automatic and selective trimmer to which my invention relates is shown in general form in United States Patent No. 2,016,799 entitled Trimmer Saw, issued to my father, Arthur E. De Koning, October 8, 1935. Reference is made to said patent for the general operation of an automatic and selective trimmer saw. By automatic, a trimmer saw is meant one which is provided with rider wheels which engage lumber or timbers passing beneath a gang of trimmer saws, which said rider wheel lifts saws from operating position so they will not cut lumber except to trim the ends thereof. A selective trimmer is one where the saws may be disengaged from their rider wheels so that knots, pitch pockets, and other imperfections may be cut out of a length of stock so as to upgrade the remainder. An automatic and selective trimmer thus is one which will serve both purposes, and to this end is provided with distantly actuated controls which permit a saw and rider wheel to move together as a unit or to permit them to be detached one from the other so that the rider wheel will not lift the saw from position, and the latter is left in its correct position to cut through a piece of stock.

Such an automatic and selective trimmer saw mechanism comprises a swingable ladder 1 supported by a bracket 2, carried by the underside of a longitudinal frame member 3. Said ladder carries a saw arbor 4 at its free end 1a, upon which saw arbor a circular saw 5 is mounted. Each trimmer saw in a gang may be individually driven or all may be driven by a common shaft 7 to which pulleys 8 are fixed. A driven pulley 9 is carried by the saw arbor to rotate the saw 5 and said pulleys 8 and 9 in each mechanism are joined by operative means such as endless belts 10.

An auxiliary arm 11 is pivotally secured to the ladder by a journal bearing 12 and at the free end of said arm a guide or rider wheel 13 is journaled. The free end 11a of the auxiliary arm is detachably joined to the free end 1a of the swingable ladder by a pivoted latch member 14. This is pivoted intermediate its ends on a pin 15 carried by the free end 11a of the auxiliary arm, and said pivoted latch member detachably engages a keeper 16 carried by the free end 1a of the swingable ladder. Said latch member and keeper are spring engaged by a coil spring 17 mounted upon pin 18 on the auxiliary arm 11. This bears against an obliquely disposed arm 14a on the latch member and tends to rotate said latch member clockwise, as viewed in Fig. 1.

The lower limit of travel of the swingable ladder and its auxiliary arm is controlled by a pendant support 19 carried by the longitudinal frame member 3. A coiled compression spring 20 and a resilient bumper 21 yieldingly hold said arm at its lower limit and the spring is loaded to tend to lift said ladder and its associated mechanism when a board or other length of lumber 22 moves under the guide or rider wheel, conveyed by the feed chain 23. Said feed chain is provided with a series of spaced upright lugs 24 and moves up along an upwardly inclined feed table 25.

This lifting of said guide or rider wheel by a piece of lumber is indicated in dotted lines in Fig. 1. Thus, although the swingable ladder and its associated mechanisms are actually lifted by said piece of lumber, the spring aids in moving said mass upwardly due to its spring loading. This may be varied by a set collar 26, having set screws 27 for engaging the pendant support 19 and fixing the initial spring loading. The spring loading is adjusted to such a point where the swingable ladder will remain at rest at its lower position. The parts are illustrated in Fig. 1 as being at set position. It is to be noted that the auxiliary arm is above the swingable ladder and is arranged substantially parallel thereto.

The journal bearing 12 is provided with a base which prevents the arm from rotating clockwise about the pivot to a point below parallelism. Thus, at set point, the latch will swing easily under the engaging face 16a of the keeper. Said latch is provided with a laterally disposed finger 14b. The latch may be rotated counterclockwise about its pin 15 by a pull cord 28 which acts against the compression of the coiled spring 17. This causes the lower end of said latch to move towards the right, as viewed in Fig. 1, and out of engagement with the engaging face 16a of the keeper. If no means were provided for holding said latch out of engagement, then upon relaxation of pull on the cord, the latch would immediately move back under and into engagement with the engaging face 16a. This would require the operator of a trimmer saw to maintain the pull on said cord 28 until a piece of lumber had engaged the guide or rider saw and had moved it upwardly to some degree at least, to prevent the reengagement of the latch with its keeper.

I have provided a gravity actuated bail or shield 29 which is U-shaped and straddles the latch and swings about a pin 30. If the latch is rotated counterclockwise by the pull cord and moves out of engagement with the keeper, then said latch is permitted to fall down and bear against the upper face 14c of the finger, which upper face 14c is the one that engages the face 16a of the keeper. This arrangement is illustrated in Fig. 2. Said bail or shield has a throat 29a for accommodating the shank of the latch to permit said bail or shield to swing readily within its operating limits. Said throat, however, has an effective depth less than the effective length of the finger 14b, and thus it cannot swing past the finger. As is shown in Fig. 2, said bail in its lower position lies upon the upper face 14c of said latch and is prevented from moving downwardly thereover. The effective over all length of said bail or shield is greater than that of the finger, and thus said bail projects beyond the finger and defines an overhang 29b beyond the extremity of the finger. This is quite important, not only because it prevents the reengagement of the latch with the keeper but also because when an operating cycle has been completed and the guide or rider wheel has moved down into axial alinement with the saw, said bail or shield has been engaged by and rotated clockwise by a shelf or step 16b on said keeper to lift the bail or shield to its original position, as is shown in Fig. 1. Thus, said overhang permits the resetting of said bail or shield at the end of each operating cycle. Thus, in absence of a pull on the cord 28, the ladder assembly, its saw, and guide or rider wheel will swing as a unit and the rider wheel will lift the saw over any piece of lumber or stock with which the rider wheel engages. The rider wheel and saw may be disengaged only after the cord 28 has been pulled to separate the latch and its keeper to permit the bail or shield 29 to fall between them. Said parts will remain disengaged through only one operating cycle. This engagement is maintained by the bail or shield just as soon as the latch has been pulled sufficiently towards the right, as viewed in Fig. 1, to permit the bail to fall down and lie intermediate the latch and its keeper, as is shown in Fig. 2. The pull on the cord may then be relaxed and the parts will not be reset until one operating cycle has been completed.

It is to be noted that a guide 31 for the pull cord 28 is located adjacent the pivot axis 32 of the swingable ladder 1, and the parts are arranged so that one run of the pull cord bisects the axis of the journal bearing 12. Thus, as said ladder or the auxiliary arm 11 moves up and down, there is no lengthening or shortening of the pull cord 28. This permits a series of pull cords, one leading to each swing saw in a gang, to be led to the operator's station, and secured to operating levers 33 in the control box 34. There is one operating lever for each unit and, because their only function is to pull a cord slightly, they may be in close proximity with each other. Thus, to move the latch on a selected saw in a gang so that it will change from an automatic riding function to a selective cutting function, an operator merely pulls back an operating lever which permits the bail or shield on that unit to drop down and to disengage the latch and its keeper. This permits the saw to move independently of the rider wheel, and thus the saw remains down in cutting position while the rider wheel moves over a length of lumber or timber moved along by the feed chain. Although such a selective operation may be used for trimming a broken end of a piece of lumber, it usually is selected in connection with the saw on an adjacent unit to remove a knot, pitch pocket, or other imperfection from a middle portion of a piece of lumber, and thus the operator must pull two or more levers for each setting.

The operation of my invention is as follows:

In modern sawmills, it is desirable that the feed chains to the trimmer saws move along as fast as possible. The limiting factor is the speed at which a trimmer man may select saws and trip the controls therefor. In automatic end trimming, operating speeds are much faster, and thus the machine thus used has a capacity much greater than when an operator in selective trimming. The operator's station, of course, must be spaced from the saws and usually is at one side thereof, although it may be overhead. Although the trimmer man's particular job is selecting saws immediately in advance of a piece of lumber to be cut, his judgment is being exercised with regard to trimming the next following piece of lumber. That is to say, an operator sizes up a piece of lumber moving into the trimmer saws, sets his saws, and then gives his attention to the next piece of lumber. The controls must be such that they may be operated more or less with the subconscious mind and without requiring a trimmer man to maintain control thereover. Thus, with my invention, it is necessary only to actuate the selected operating levers 33 in advance of the work, and then to forget them. The arrangement of the parts is such that the saws are reset automatically at the end of an operating cycle. He may then give his attention to the next piece of lumber to be trimmed. He must decide whether an imperfection should be cut out to permit the remaining pieces of lumber to be upgraded or whether this would spoil its commercial value. If he comes to the latter conclusion, he leaves the imperfection in the board. He also must look at the ends thereof to see whether they are broken, and whether the automatic trimmer will cut them off. Otherwise, he will have to set an inboard saw if the broken edge projects beyond the normal lateral spacing between the saws in the gang. When a lever 33 is pulled down, it causes the cord 28 secured thereto to rock the latch member 14 counterclockwise against the action of the spring. When it is thus rocked, the bail or shield falls down and the free end of said bail or shield bears against the keeper to prevent reengagement of the latch therewith. Then, when a peice of lumbr 22 moves under the trimmer saw, it lifts the guide or rider wheel and when the rider wheel comes down again after the lumber has passed through, the rider wheel and the saw move into axial alinement. This downward movement causes the shelf or stop 16b to engage the overhang 29b of the bail or shield and lift it from shrouding position with regard to the finger 14b of the keeper, and is carried upward to rest upon said shelf or stop, as illustrated in Fig. 1.

Although the distant operating mechanism for controlling the engagement and disengagement of the latch member 14 with its keeper 16 is shown as by manual pull cords 28, I did not wish my invention limited to such type of control. As is shown in United States Patent No. 2,016,799, issued to my father, A. E. De Koning, it is also common to manipulate said latching mechanism by electric circuits and electromagnets. Other types of distant actuation are also possible, such as by the use of air valves, hydraulic valves, or other means which would suggest themselves to persons skilled in the art. The use of manual pull cords is probably the simplest mechanism, however, and thus I have used this type of control to illustrate my invention.

I claim:

1. In a trimmer saw mechanism comprising a pivotally mounted ladder assembly, a circular saw journaled on the free end thereof, an auxiliary arm pivotally secured to said ladder, a lumber engaging lift wheel journaled on the free end of said auxiliary arm and having disengageable latch means for joining the free ends of said ladder assembly and auxiliary arm together, whereby they may swing as a unit about the pivotal mounting for said ladder, said disengageable latch means comprising a movable hooked latch element and a keeper therefor, said latch element and said keeper being spring engaged, and a manually selectable gravity actuated shield movably carried by one of said latter parts, insertable between the latch and its keeper to inhibit mutual engagement thereof when said shield lies indeterminate the latch and its keeper.

2. In a trimmer saw mechanism comprising a pivotally mounted ladder assembly, a circular saw journaled on the free end thereof, an auxiliary arm pivotally secured to said ladder, a lumber engaging lift wheel journaled on the free end of said auxiliary arm and having disengageable latch means for joining the free ends of said ladder assembly and auxiliary arm together, whereby they may swing as a unit about the pivotal mounting for said ladder, said disengageable latch means comprising a movable hooked latch element and a keeper therefor, said latch element and said keeper being spring engaged, and a manually selectable manipulable shield carried by one of said parts, insertable between the latch and its keeper to inhibit mutual engagement thereof when said shield lies indeterminate the latch and its keeper.

3. In a trimmer saw mechanism comprising a pivotally mounted ladder assembly, a circular saw journaled on the free end thereof, an auxiliary arm pivotally secured to said ladder, a lumber engaging lift wheel journaled on the free end of said auxiliary arm and having disengageable latch means for joining the free ends of said ladder assembly and auxiliary arm together, whereby they may swing as a unit about the pivotal mounting for said ladder, said disengageable latch means comprising a movable hooked latch element and a keeper therefor, said latch element and said keeper being spring engaged, a manually selectable manipulable shield carried by one of said parts, insertable between the latch and its keeper to inhibit mutual engagement thereof when said shield lies indeterminate the latch and its keeper, and distant means for disengaging and separating the latch member and its keeper, thereby to accommodate said shield therebetween.

4. A trimmer saw mechanism including a swingable ladder, a pivot axis for said swingable ladder, a circular saw journaled at the free end thereof, an auxiliary arm, a rider element carried by the free end of said arm, and detachable engaging means for securing said arm to said ladder to cause them to swing as a unit, and a distantly actuated tripping mechanism for disengaging said engaging means to permit said ladder and said arm to swing independently of each other, said tripping means including a flexible cord and a guide therefor over which said cord is reeved, said guide being arranged in substantial alinement with the pivot axis of said swingable ladder whereby the swinging of said ladder will not shift said cord along its guide.

5. A trimmer saw mechanism including a swingable ladder, a circular saw journaled at the free end thereof, an auxiliary arm, a rider element carried by the free end of said arm, and detachable engaging means for securing said arm to said ladder to cause them to swing as a unit, a distantly actuated tripping mechanism for disengaging said engaging means to permit said ladder and said arm to swing independently of each other, a bail-like guard carried by one of said parts, movable under the influence of gravity to hold said engaging means inoperative, and means carried by said engaging means for resetting said guard after each operation of said trimmer saw mechanism.

6. A trimmer saw mechanism including a swingable ladder, a circular saw journaled at the free end thereof, an auxiliary arm, a rider element carried by the free end of said arm, and detachable engaging means for securing said arm to said ladder to cause them to swing as a unit, a distantly actuated tripping mechanism for disengaging said engaging means to permit said ladder and said arm to swing independently of each other, a bail-like guard carried by one of said parts, movable under the influence of gravity to hold said engaging means inoperative, and means carried by said engaging means for resetting said guard after each operation of said trimmer saw mechanism, said engaging means including a movable spring-closed latch and a keeper therefor, said latch and keeper being mutually engageable, said keeper and said latch being carried one on the free end of said ladder assembly and the other on said auxiliary arm.

7. A trimmer saw mechanism including a swingable ladder, a circular saw journaled at the free end thereof, an auxiliary arm, a rider element carried by the free end of said arm, and detachable engaging means for securing said arm to said ladder to cause them to swing as a unit, a distantly actuated tripping mechanism for disengaging said engaging means to permit said ladder and said arm to swing independently of each other, said engaging means including a movable spring-closed latch and a keeper therefor, said latch and keeper being mutually engageable, said keeper and said latch being carried one on the free end of said ladder assembly and the other on said auxiliary arm, the latch member including a laterally projecting finger, and a pivoted bail straddling said latch member and pivotally mounted to swing into and out of shrouding relation with said projecting finger.

8. A trimmer saw mechanism including a swingable ladder, a circular saw journaled at the free end thereof, an auxiliary arm, a rider element carried by the free end of said arm, and detachable engaging means for securing said arm to said ladder to cause them to swing as a unit, a distantly actuated tripping mechanism for disengaging said engaging means to permit said ladder and said arm to swing independently of each other, said engaging means including a movable spring-closed latch and a keeper therefor, said latch and keeper being mutually engageable, said keeper and said latch being carried one on the free end of said ladder assembly and the other on said auxiliary arm, the latch member including a laterally projecting finger, a pivoted bail straddling said latch member and pivotally mounted to swing into and out of shrouding relation with said projecting finger, said bail having a throat of lesser depth than the length of the finger of said latch, whereby said finger engages and holds said bail in shrouding position when the bail and latch finger come into abutment.

9. A trimmer saw mechanism including a swingable ladder, a circular saw journaled at the free end thereof, an auxiliary arm, a rider element carried by the free end of said arm, and detachable engaging means for securing said arm to said ladder to cause them to swing as a unit, a distantly actuated tripping mechanism for disengaging said engaging means to permit said ladder and said arm to swing independently of each other, said engaging means including a movable spring-closed latch and a keeper therefor, said latch and keeper being mutually engageable, said keeper and said latch being carried one on the free end of said ladder assembly and the other on said auxiliary arm, the latch member including a laterally projecting finger, a pivoted bail straddling said latch member and pivotally mounted to swing into and out of shrouding relation with said projecting finger, said bail having a throat of lesser depth than the length of the finger of said latch, whereby said finger engages and holds said bail in shrouding position when the bail and latch finger come into abutment, the free effective length of said bail being greater than that of the latch finger so that said bail projects beyond said finger and produces overhang, and a step on said keeper for engaging said overhang to lift said bail at the end of each operating swing of said trimmer saw mechanism and to permit the engagement of said engaging means.

10. A trimmer saw mechanism including a swingable ladder, a circular saw journaled at the free end thereof, an auxiliary arm, a rider element carried by the free end of said arm, and detachable engaging means for securing said arm to said ladder to cause them to swing as a unit, a distantly actuated tripping mechanism for disengaging said engaging means to permit said ladder and said arm to swing independently of each other, said engaging means including a movable spring-closed latch and a keeper therefor, said latch and keeper being mutually engageable, said keeper and said latch being carried one on the free end of said ladder assembly and the other on said auxiliary arm, the latch member including a laterally projecting finger, a pivoted bail straddling said latch member and pivotally mounted to swing into and out of shrouding relation with said projecting finger, said bail having a throat of lesser depth than the length of the finger of said latch, whereby said finger engages and holds said bail in shrouding position when the bail and latch finger come into abutment, the free effective length of said bail being greater than that of the latch finger so that said bail projects beyond said finger and produces overhang, and a projection on said keeper for engaging said overhang to lift said bail at the end of each operating swing of said trimmer saw mechanism and to permit the engagement of said engaging means.

References Cited in the file of this patent

UNITED STATES PATENTS

| Number | Name | Date |
| --- | --- | --- |
| 238,815 | Stearns | Mar. 15, 1881 |
| 550,594 | Coleman | Dec. 3, 1895 |
| 836,095 | Cook | Nov. 20, 1906 |
| 1,454,992 | Willette | May 15, 1923 |
| 1,645,750 | Graffinberger | Oct. 18, 1927 |
| 2,016,799 | De Koning | Oct. 8, 1935 |
| 2,091,647 | Nicholson | Aug. 31, 1937 |
| 2,150,746 | Nampa | May 14, 1939 |